(12) United States Patent
Yanagisawa et al.

(10) Patent No.: US 8,853,442 B2
(45) Date of Patent: *Oct. 7, 2014

(54) RESIN CROSSLINKING AGENT

(75) Inventors: Kenichi Yanagisawa, Chiba (JP); Saori Kotani, Chiba (JP)

(73) Assignee: Nisshinbo Holdings, Inc., Tokyo (JP)

( * ) Notice: Subject to any disclaimer, the term of this patent is extended or adjusted under 35 U.S.C. 154(b) by 121 days.

This patent is subject to a terminal disclaimer.

(21) Appl. No.: 13/514,569

(22) PCT Filed: Dec. 24, 2010

(86) PCT No.: PCT/JP2010/073360
§ 371 (c)(1),
(2), (4) Date: Jun. 7, 2012

(87) PCT Pub. No.: WO2011/078331
PCT Pub. Date: Jun. 30, 2011

(65) Prior Publication Data
US 2012/0264968 A1 Oct. 18, 2012

(30) Foreign Application Priority Data

Dec. 24, 2009 (JP) ................. 2009-293233

(51) Int. Cl.
*C08G 73/00* (2006.01)
*C08G 65/333* (2006.01)
*C08G 18/28* (2006.01)
*C08G 18/08* (2006.01)
*C08K 5/05* (2006.01)
*C08G 18/02* (2006.01)
*C08L 71/00* (2006.01)
*C09D 175/04* (2006.01)
*C08G 81/00* (2006.01)

(52) U.S. Cl.
CPC .......... *C08G 18/025* (2013.01); *C08G 18/284* (2013.01); *C08G 18/0866* (2013.01); *C08K 5/05* (2013.01); *C08L 71/00* (2013.01); *C09D 175/04* (2013.01); *C08G 18/283* (2013.01); *C08G 18/282* (2013.01); *C08G 65/333* (2013.01); *C08G 81/00* (2013.01); *Y10S 524/901* (2013.01)
USPC .......... 560/159; 560/158; 564/252; 524/800; 524/802; 524/839; 524/901; 528/61; 528/170

(58) Field of Classification Search
USPC ............ 560/158, 159; 564/252; 528/61, 170; 524/800, 802, 839, 901
See application file for complete search history.

(56) References Cited

U.S. PATENT DOCUMENTS

| | | | |
|---|---|---|---|
| 6,121,406 A | 9/2000 | Imashiro et al. | |
| 6,124,398 A | 9/2000 | Imashiro et al. | |
| 8,604,154 B2 * | 12/2013 | Takahashi et al. | ............ 528/170 |
| 2010/0324206 A1 | 12/2010 | Richards et al. | |
| 2011/0021679 A1 | 1/2011 | Takahashi et al. | |

FOREIGN PATENT DOCUMENTS

| | | |
|---|---|---|
| EP | 2 248 837 A1 | 11/2010 |
| JP | 2000-7642 A | 1/2000 |
| JP | 2000-319351 A | 11/2000 |
| JP | 2006-22133 A | 1/2006 |
| JP | 2009-235278 A | 10/2009 |
| WO | WO 99/34833 A1 | 7/1999 |
| WO | WO 03/041458 A1 | 5/2003 |
| WO | WO 2008/070601 A2 | 6/2008 |

OTHER PUBLICATIONS

International Search Report issued in PCT/JP2010/073360, mailed Feb. 8, 2011.
Extended European Search Report, dated May 21, 2013, issued in corresponding EP Patent Application No. 10839560.9.

* cited by examiner

*Primary Examiner* — Shailendra Kumar
(74) *Attorney, Agent, or Firm* — Birch, Stewart, Kolasch & Birch, LLP

(57) ABSTRACT

A resin crosslinking agent that is capable of enhancing the scuffing resistance and the chemical resistance upon adding a carbodiimide compound as a crosslinking agent to an aqueous resin. The resin crosslinking agent contains: a carbodiimide compound having at least one carbodiimide group, having terminals that are capped with at least one compound (hydrophilic organic compound I) selected from a dialkylamino alcohol, a hydroxycarboxylic acid alkyl ester and a (poly)alkylene glycol monoalkyl ether, and with a compound (hydrophilic organic compound II) that has higher hydrophilicity than the hydrophilic organic compound I and has at least one hydroxyl group; and a water-miscible liquid compound.

8 Claims, No Drawings

RESIN CROSSLINKING AGENT

This application is a 371 of PCT/JP10/73360, filed Dec. 24, 2010.

TECHNICAL FIELD

The present invention relates to a resin crosslinking agent, and more specifically, relates to a resin crosslinking agent that is capable of enhancing the scuffing resistance and the chemical resistance.

BACKGROUND ART

An aqueous resin, which is water soluble or water dispersible, is being used in various fields including paints, ink, fiber treating agents, adhesives, coating agents and the like.

The water soluble or water dispersible aqueous paint uses an aqueous medium, and thus is free of risk for environmental pollution and fire, and cleaning of painting equipments, such as a brush, a roller and a spray gun, and removal of contamination with the paint may be performed with water. Owing to these factors, there are increasing demands of the aqueous paints in recent years.

The aqueous resin generally has a carboxyl group introduced thereto for imparting water solubility or water dispersibility to the resin itself. Accordingly, the carboxyl group remaining in the coated film may induce hydrolysis, which may impair the strength, durability and appearance of the coated film.

As a measure for enhancing the properties including the strength, water resistance and durability of the coated film of the aqueous resin, such as method is ordinarily employed that an external crosslinking agent, such as an aqueous melamine resin, an aziridine compound and a water dispersible isocyanate compound, which is capable of forming a crosslinked structure through reaction with the carboxyl group, is used in combination.

However, the crosslinking agent may be difficult to use in some cases due to toxicity, reactivity and the like. Specifically, the crosslinking reaction with the crosslinking agent proceeds while consuming the carboxyl group, and therefore, the strength, water resistance, durability and the like of the coated film may be enhanced by reducing the carboxyl group, but the unreacted crosslinking agent remaining if any may cause toxicity in the coated film. When the unreacted carboxyl group remains in the coated film, on the other hand, the water resistance and durability of the coated film may be lowered. Accordingly, various problems may occur in the case where the crosslinking agent and the carboxyl group in the aqueous resin are not completely reacted.

For solving the problem of toxicity, a carbodiimide compound is receiving attention in recent years. For example, Patent Document 1 discloses aqueous dicyclohexylmethanecarbodiimide that has good reactivity and storage stability and convenient handleability as a crosslinking agent for an aqueous resin.

The aqueous dicyclohexylmethanecarbodiimide has no toxicity and has sufficient pot life.

Patent Document 2 discloses a water soluble or water dispersible carbodiimide compound capable of enhancing water resistance, solvent resistance and adhesiveness, which is formed by, upon hydrophilizing the carbodiimide compound, introducing methyl glycolate or methyl lactate, which has a structure close to the aqueous urethane resin and the aqueous acrylic resin, into the terminals thereof.

RELATED ART DOCUMENTS

Patent Documents

Patent Document 1: JP-A-2000-7462
Patent Document 2: JP-A-2009-235278

SUMMARY OF THE INVENTION

Problems to be Solved by the Invention

However, the inventors have found that the aforementioned carbodiimide compounds have high safety and convenient handleability, but upon using as a floor coating material for tiles and wooden floors, have such problems that the scuffing resistance and the chemical resistance may not be sufficiently satisfied in the case where an aqueous resin is cured at room temperature, although water resistance and adhesiveness are obtained.

Accordingly, an object of the present invention is to provide a resin crosslinking agent that is capable of enhancing the scuffing resistance and the chemical resistance upon adding a carbodiimide compound as a crosslinking agent to an aqueous resin.

Means for Solving the Problems

As a result of earnest investigations made for achieving the object by the inventors, it has been found that the problems may be solved by a resin crosslinking agent that contains: a carbodiimide compound having isocyanate terminals that are capped with a particular hydrophilic organic compound and with a compound that has higher hydrophilicity than the particular hydrophilic organic compound and has at least one hydroxyl group; and a water-miscible liquid compound.

The present invention thus provides:

1. a resin crosslinking agent containing: a carbodiimide compound having at least one carbodiimide group, having terminals that are capped with at least one compound (hydrophilic organic compound I) selected from a dialkylamino alcohol, a hydroxycarboxylic acid alkyl ester and a (poly) alkylene glycol monoalkyl ether, and with a compound (hydrophilic organic compound II) that has higher hydrophilicity than the hydrophilic organic compound I and has at least one hydroxyl group; and a water-miscible liquid compound, 2. the resin crosslinking agent according to the item 1, wherein the carbodiimide compound is a carbodiimide compound represented by the general formula (1):

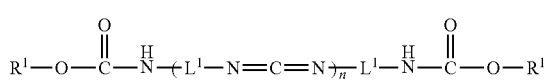

(1)

wherein n represents an integer of from 1 to 15; $L^1$ represents a divalent aliphatic hydrocarbon group having from 1 to 18 carbon atoms, a divalent alicyclic hydrocarbon group having from 3 to 13 carbon atoms, a divalent aromatic hydrocarbon group having from 6 to 14 carbon atoms or a divalent heterocyclic group having from 3 to 12 carbon atoms, in which plural groups represented by $L^1$ may be the same as or different from each other; and $R^1$ represents a residual group of at least one compound (hydrophilic organic compound I) selected from a dialkylamino alcohol, a hydroxycarboxylic acid alkyl ester and a (poly)alkylene glycol monoalkyl ether, or a residual group of a compound (hydrophilic organic compound II) that has higher hydrophilicity than the hydrophilic organic compound I and has at least one hydroxyl group, in which two groups represented by $R^1$ may be the same as or different from each other, 3. the resin crosslinking agent according to the item 1 or 2, wherein a ratio (molar ratio) of the at least one compound (hydrophilic organic compound I) selected from a dialkylamino alcohol, a hydroxycarboxylic acid alkyl ester and a (poly)alkylene glycol monoalkyl ether and the compound (hydrophilic organic compound II) that has higher hydrophilicity than the hydrophilic organic compound I and has at least one hydroxyl group is from 9/1 to 1/9, 4. the resin crosslinking agent according to the item 2 or 3, wherein $R^1$ represents a residual group of at least one compound (hydrophilic organic compound I-a) selected from:

a dialkylamino alcohol represented by the general formula (A):

$$(R^2)_2\text{—N—CH}_2\text{—CHR}^3\text{—OH} \quad (A)$$

wherein $R^2$ represents an alkyl group having from 1 to 4 carbon atoms, and $R^3$ represents a hydrogen atom or an alkyl group having from 1 to 4 carbon atoms, a hydroxycarboxylic acid alkyl ester represented by the general formula (B):

wherein $R^4$ represents an alkyl group having from 1 to 3 carbon atoms, and $R^5$ represents a hydrogen atom or an alkyl group having from 1 to 3 carbon atoms, and a (poly) alkylene glycol monoalkyl ether represented by the general formula (C):

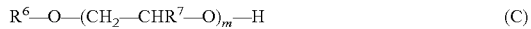

$$R^6\text{—O—(CH}_2\text{—CHR}^7\text{—O)}_m\text{—H} \quad (C)$$

wherein $R^6$ represents an alkyl group having from 1 to 4 carbon atoms, $R^7$ represents a hydrogen atom or an alkyl group having from 1 to 4 carbon atoms, and m represents an integer of from 1 to 3, or a residual group of a polyalkylene oxide having terminals capped with an alkoxy group or a phenoxy group, which is a compound that has higher hydrophilicity than the hydrophilic organic compound I-a and is represented by the general formula (D):

$$R^8\text{—O—(CH}_2\text{—CHR}^9\text{—O)}_m\text{—H} \quad (D)$$

wherein $R^8$ represents an alkyl group having from 1 to 4 carbon atoms or a phenyl group, $R^9$ represents a hydrogen atom or an alkyl group having from 1 to 4 carbon atoms, and m represents an integer of from 4 to 30, 5. the resin crosslinking agent according to any one of the items 1 to 4, wherein the water-miscible liquid compound contains a water-miscible liquid compound represented by the general formula (2):

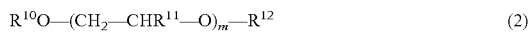

$$R^{10}\text{O—(CH}_2\text{—CHR}^{11}\text{—O)}_m\text{—R}^{12} \quad (2)$$

wherein $R^{10}$ and $R^{12}$ each represent an alkyl group or acyl group having from 1 to 4 carbon atoms, a hydrogen atom or a phenyl group, $R^{11}$ represents a hydrogen atom or a methyl group, and m represents an integer of from 1 to 3, 6. the resin crosslinking agent according to any one of the items 1 to 4, wherein the water-miscible liquid compound is a monoalcohol having from 3 to 10 carbon atoms, and 7. the resin crosslinking agent according to any one of the items 1 to 6, wherein $L^1$ represents a divalent group of dicyclohexylmethane or a tetramethylxylylene group.

Advantages of the Invention

According to the present invention, a resin crosslinking agent is provided that is capable of enhancing the scuffing resistance and the chemical resistance upon adding a carbodiimide compound as a crosslinking agent to an aqueous resin.

EMBODIMENTS FOR CARRYING OUT THE INVENTION

The present invention will be described in detail below.

The resin crosslinking agent of the present invention contains: a carbodiimide compound having at least one carbodiimide group, having terminals that are capped with at least one compound (hydrophilic organic compound I) selected from a dialkylamino alcohol, a hydroxycarboxylic acid alkyl ester and a (poly)alkylene glycol monoalkyl ether, and with a compound (hydrophilic organic compound II) that has higher hydrophilicity than the hydrophilic organic compound I and has at least one hydroxyl group; and a water-miscible liquid compound.

In the present description, the at least one compound selected from a dialkylamino alcohol, a hydroxycarboxylic acid alkyl ester and a (poly)alkylene glycol monoalkyl ether may be referred to as a "hydrophilic organic compound I", and the compound that has higher hydrophilicity than the hydrophilic organic compound I and has at least one hydroxyl group may be referred to as a "hydrophilic organic compound II".

The carbodiimide compound used in the present invention is a carbodiimide compound having isocyanate terminals that are capped with the hydrophilic organic compound I and a compound that has higher hydrophilicity than the hydrophilic organic compound I and has at least one hydroxyl group (hydrophilic organic compound II), and is preferably a carbodiimide compound represented by the following general formula (1):

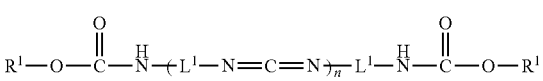

(1)

$$R^1\text{—O—}\overset{O}{\overset{\|}{C}}\text{—}\overset{H}{\overset{|}{N}}\text{—}(L^1\text{—N}=C=N)_n\text{—}L^1\text{—}\overset{H}{\overset{|}{N}}\text{—}\overset{O}{\overset{\|}{C}}\text{—O—R}^1$$

wherein n represents an integer of from 1 to 15; $L^1$ represents a divalent aliphatic hydrocarbon group having from 1 to 18 carbon atoms, a divalent alicyclic hydrocarbon group having from 3 to 13 carbon atoms, a divalent aromatic hydrocarbon group having from 6 to 14 carbon atoms or a divalent heterocyclic group having from 3 to 12 carbon atoms, in which plural groups represented by $L^1$ may be the same as or different from each other; and $R^1$ represents a residual group of at least one compound (hydrophilic organic compound I) selected from a dialkylamino alcohol, a hydroxycarboxylic acid alkyl ester and a (poly)alkylene glycol monoalkyl ether, or a residual group of a compound (hydrophilic organic compound II) that has higher hydrophilicity than at lest one compound selected from the dialkylamino alcohol, the hydroxycarboxylic acid alkyl ester and the (poly)alkylene glycol monoalkyl ether and has at least one hydroxyl group, in which two groups represented by $R^1$ may be the same as or different from each other.

In the general formula (I), n represents an integer of from 1 to 15, preferably from 2 to 10, and more preferably from 2 to 8. In the case where the n is in the range, the polycarbodiimide compound has solubility or water dispersibility to an aqueous paint composition.

The divalent aliphatic hydrocarbon group having from 1 to 18 carbon atoms, the divalent alicyclic hydrocarbon group having from 3 to 13 carbon atoms, the divalent aromatic hydrocarbon group having from 6 to 14 carbon atoms and the divalent heterocyclic group having from 3 to 12 carbon atoms represented by $L^1$ each may have a substituent, and preferred examples of the substituent include an alkyl group, an alkenyl group, an alkynyl group, an aryl group, an amino group, an alkoxy group, an aryloxy group, an acyl group, an alkoxycarbonyl group, an aryloxycarbonyl group, an acyloxy group, an acylamino group, an alkoxycarbonylamino group, an aryloxycarbonylamino group, a sulfonylamino group, a sulfamoyl group, a carbamoyl group, an alkylthio group, an arylthio group, a sulfonyl group, a halogen atom, a cyano group and an aromatic heterocyclic group, more preferred examples thereof include an alkyl group, an aryl group, an alkoxy group, an aryloxy group, a halogen atom and a cyano group, further preferred examples thereof include an alkyl group, an aryl group, an alkoxy group and an aryloxy group, and particularly preferred examples thereof include an alkyl group, an aryl group and an alkoxy group.

Specific examples of the divalent aliphatic hydrocarbon group having from 1 to 18 carbon atoms represented by $L^1$ in the general formula (1) include divalent groups of a methyl group, an ethyl group, a propyl group, an isopropyl group, a n-butyl group, a sec-butyl group, a tert-butyl group, a pentyl group, a hexyl group, a heptyl group, an octyl group, a stearyl group, a 2-phenylisopropyl group, a benzyl group, an α-phenoxybenzyl group, an α,α-dimethylbenzyl group, an α,α-methylphenylbenzyl group, an α,α-ditrifluoromethylbenzyl group and an α-benzyloxybenzyl group.

Specific examples of the divalent alicyclic hydrocarbon group having from 3 to 13 carbon atoms represented by $L^1$ in the general formula (1) include divalent groups of a cyclopropyl group, a cyclobutyl group, a cyclopentyl group, a cyclohexyl group, a cycloheptyl group, a cyclooctyl group, a cyclononyl group, a bicycloheptyl group, a bicyclooctyl group, a tricycloheptyl group and an adamantyl group, and a divalent group of dicyclohexylmethane, and preferred examples thereof include divalent groups of a cyclopentyl group, a cyclohexyl group, a cycloheptyl group, a bicycloheptyl group, a bicyclooctyl group and an adamantyl group, and a divalent group of dicyclohexylmethane.

Specific examples of the divalent aromatic hydrocarbon group having from 6 to 14 carbon atoms represented by $L^1$ in the general formula (1) include a phenylene group, a naphthylene group, a biphenylene group, an anthranylene group, a perylenylene group and a pyrenylene group, and preferred examples thereof include a phenylene group, a naphthylene group and a biphenylene group.

Specific examples of the divalent heterocyclic group having from 3 to 12 carbon atoms represented by $L^1$ in the general formula (1) include imidazole, benzoimidazole, pyrrole, furan, thiophene, benzothiophene, oxadiazoline, indoline, carbazole, pyridine, quinoline, isoquinoline, benzoquinone, pyrazine, imidazolidine and piperidine.

As $L^1$ in the general formula (1), the above-exemplified groups may be used solely or as a combination of plural kinds of the groups.

$L^1$ in the general formula (1) more preferably represents a divalent group of dicyclohexylmethane or a tetramethylxylylene group.

In the general formula (1), $R^1$ represents a residual group of at least one compound (hydrophilic organic compound I) selected from a dialkylamino alcohol, a hydroxycarboxylic acid alkyl ester and a (poly)alkylene glycol monoalkyl ether, or a residual group of a compound (hydrophilic organic compound II) that has higher hydrophilicity than the hydrophilic organic compound I and has at least one hydroxyl group.

$R^1$ preferably represents a residual group of at least one compound (hydrophilic organic compound I-a) selected from:

a dialkylamino alcohol represented by the general formula (A):

$$(R^2)_2\text{—N—CH}_2\text{—CHR}^3\text{—OH} \qquad (A)$$

wherein $R^2$ represents an alkyl group having from 1 to 4 carbon atoms, and $R^3$ represents a hydrogen atom or an alkyl group having from 1 to 4 carbon atoms, a hydroxycarboxylic acid alkyl ester represented by the general formula (B):

(B)

wherein $R^4$ represents an alkyl group having from 1 to 3 carbon atoms, and $R^5$ represents a hydrogen atom or an alkyl group having from 1 to 3 carbon atoms, and a (poly)alkylene glycol monoalkyl ether represented by the general formula (C):

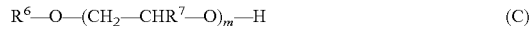

$$R^6\text{—O—(CH}_2\text{—CHR}^7\text{—O)}_m\text{—H} \qquad (C)$$

wherein $R^6$ represents an alkyl group having from 1 to 4 carbon atoms, $R^7$ represents a hydrogen atom or an alkyl group having from 1 to 4 carbon atoms, and m represents an integer of from 1 to 3, or a residual group of a polyalkylene oxide having terminals capped with an alkoxy group or a phenoxy group, which is a compound that has higher hydrophilicity than the hydrophilic organic compound I-a and is represented by the general formula (D):

$$R^8\text{—O—(CH}_2\text{—CHR}^9\text{—O)}_m\text{—H} \qquad (D)$$

wherein $R^8$ represents an alkyl group having from 1 to 4 carbon atoms or a phenyl group, $R^9$ represents a hydrogen atom or an alkyl group having from 1 to 4 carbon atoms, and m represents an integer of from 4 to 30.

In the general formula (1), two groups of $R^1$ may be the same as or different from each other.

Hydrophilic Organic Compound I

In the present invention, the hydrophilic organic compound I used is at least one compound selected from a dialkylamino alcohol, a hydroxycarboxylic acid alkyl ester and a (poly)alkylene glycol monoalkyl ether.

The dialkylamino alcohol is specifically preferably a dialkylamino alcohol represented by the general formula (A):

$$(R^2)_2\text{—N—CH}_2\text{—CHR}^3\text{—OH} \qquad (A)$$

wherein $R^2$ represents an alkyl group having from 1 to 4 carbon atoms, and $R^3$ represents a hydrogen atom or an alkyl group having from 1 to 4 carbon atoms.

More specific examples thereof include 3-dimethylamino-1-propanol, 3-diethylamino-1-propanol, 1-diethylamino-2-propanol, diethylisopropanolamine, dimethylethanolamine and dibutylethanolamine. Among these, diethylisopropanolamine, dimethylethanolamine and dibutylethanolamine are preferred, and diethylisopropanolamine is more preferred.

The hydrophilic organic compound A represented by the general formula (A) may be used solely or as a combination of two or more kinds of the compounds.

The hydroxycarboxylic acid alkyl ester is preferably a hydroxycarboxylic acid alkyl ester represented by the general formula (B):

wherein $R^4$ represents an alkyl group having from 1 to 3 carbon atoms, and $R^5$ represents a hydrogen atom or an alkyl group having from 1 to 3 carbon atoms.

Specific examples of the alkyl group having from 1 to 3 carbon atoms represented by $R^4$ and $R^5$ in the general formula (B) include a methyl group, an ethyl group, a propyl group and an isopropyl group.

The hydrophilic organic compound B represented by the general formula (B) may be used solely or as a combination of two or more kinds of the compounds.

The hydrophilic organic compound B represented by the general formula (B) is preferably methyl glycolate or methyl lactate.

The (poly) alkylene glycol monoalkyl ether is preferably a (poly)alkylene glycol monoalkyl ether represented by the general formula (C):

wherein $R^6$ represents an alkyl group having from 1 to 4 carbon atoms, $R^7$ represents a hydrogen atom or an alkyl group having from 1 to 4 carbon atoms, and m represents an integer of from 1 to 3.

Specific examples of the alkyl group having from 1 to 4 carbon atoms represented by $R^6$ in the general formula (C) include a methyl group, an ethyl group, a propyl group, an isopropyl group, a n-butyl group, a s-butyl group, an isobutyl group and a t-butyl group.

Specific examples of the hydrogen atom or the alkyl group having from 1 to 4 carbon atoms represented by $R^7$ in the general formula (C) include a methyl group, an ethyl group, a propyl group, an isopropyl group, a n-butyl group, a s-butyl group, an isobutyl group and a t-butyl group.

The hydrophilic organic compound C represented by the general formula (C) may be used solely or as a combination of two or more kinds of the compounds.

Hydrophilic Organic Compound II

The hydrophilic organic compound II used in the present invention is not particularly limited as far as the compound has higher hydrophilicity than the hydrophilic organic compound I and has at least one hydroxyl group, and examples thereof include a polyalkylene oxide having terminals capped with an alkoxy group or a phenoxy group, which is a compound that has higher hydrophilicity than at least one compound selected from the hydrophilic organic compounds A to C (which may be hereinafter referred to as a "hydrophilic organic compound I-a") and is represented by the general formula (D):

wherein $R^8$ represents an alkyl group having from 1 to 4 carbon atoms or a phenyl group, $R^9$ represents a hydrogen atom or an alkyl group having from 1 to 4 carbon atoms, and m represents an integer of from 4 to 30.

Specific examples thereof include polyethylene glycol monomethyl ether, polyethylene glycol monoethyl ether, polypropylene glycol monomethyl ether, polypropylene glycol monoethyl ether and polypropylene glycol monophenyl ether, and polyethylene glycol monomethyl ether is particularly preferred.

Specific examples of the alkyl group having from 1 to 4 carbon atoms represented by $R^8$ and $R^9$ in the general formula (D) include a methyl group, an ethyl group, a propyl group, an isopropyl group, a n-butyl group, a s-butyl group, an isobutyl group and a t-butyl group.

The hydrophilic organic compound D represented by the general formula (D) may be used solely or as a combination of two or more kinds of the compounds.

The carbodiimide compound used in the present invention can be obtained, for example, in such a manner that an isocyanate-terminated polycarbodiimide compound is synthesized by condensation reaction of an organic diisocyanate compound associated with elimination of carbon dioxide, and then the isocyanate-terminated polycarbodiimide compound is reacted with at least one compound (hydrophilic organic compound I) selected from a dialkylamino alcohol, a hydroxycarboxylic acid alkyl ester and a (poly) alkylene glycol monoalkyl ether, and a compound (hydrophilic organic compound II) that has higher hydrophilicity than the hydrophilic organic compound I and has at least one hydroxyl group.

Examples of the organic diisocyanate compound as a starting material of the isocyanate-terminated polycarbodiimide compound include an aromatic diisocyanate compound, an aliphatic diisocyanate compound, an alicyclic diisocyanate compound, a heterocyclic diisocyanate compound, and mixtures thereof. Specific examples thereof include 1,5-naphthylenediisocyanate, 4,4'-diphenylmethanediisocyanate, 4,4'-diphenyldimethylmethanediisocyanate, 1,3-phenylenediisocyanate, 1,4-phenylenediisocyanate, 2,4-tolylenediisocyanate, 2,6-tolylenediisocyanate, a mixture of 2,4-tolylenediisocyanate and 2,6-tolylenediisocyanate, hexamethylenediisocyanate, cyclohexane-1,4-diisocyanate, xylylenediisocyanate, isophoronediisocyanate, dicyclohexylmethane-4,4'-diisocyanate, methylcyclohexanediisocyanate, tetramethylxylylenediisocyanate and 2,5(2,6)-bis(isocyanatomethyl)bicyclo[2.2.1]heptane.

The condensation reaction of the organic diisocyanate compound associated with elimination of carbon dioxide may proceed in the presence of a carbodiimidation catalyst. Examples of the catalyst used include a phospholene oxide compound, such as 1-phenyl-2-phospholene-1-oxide, 3-methyl-2-phospholene-1-oxide, 1-ethyl-2-phospholene-1-oxide, 3-methyl-1-phenyl-2-phospholene-1-oxide, and 3-phospholene isomers of these compounds, and among these, 3-methyl-1-phenyl-2-phospholene-1-oxide is preferred from the standpoint of the reactivity. The catalyst may be used in a catalytic amount.

The reaction temperature in the condensation reaction of the organic diisocyanate compound is generally approximately from 80 to 200° C.

The reaction temperature upon adding the hydrophilic segment by reacting the isocyanate-terminated polycarbodiimide compound with the hydrophilic organic compound I and the hydrophilic organic compound II, preferably with at least one compound (hydrophilic organic compound I-a) selected from the hydrophilic organic compounds A to C and the hydrophilic organic compound D, is generally from 60 to 180° C., and preferably from 100 to 160° C.

Among the carbodiimide compounds obtained above, an aliphatic dicarbodiimide compound is preferably used in the resin crosslinking agent of the present invention from the standpoint of the reactivity and the storage stability, and dicyclohexylmethanecarbodiimide and tetramethylxylylenecarbodiimide are more preferably used therein, and dicyclohexylmethanecarbodiimide is particularly preferably used therein. Dicyclohexylmethanecarbodiimide may be obtained in such a manner that 4,4'-dicyclohexylmethanediisocyanate is condensed in the presence of the carbodiimidation catalyst to prepare isocyanate-terminated dicyclohexylmethanecarbodiimide, which is then reacted with the hydrophilic organic compound I and the hydrophilic organic compound II, preferably with at least one compound (hydrophilic organic compound I-a) selected from the hydrophilic organic compounds A to C and the hydrophilic organic compound D, thereby capping the terminal isocyanate group with the hydrophilic segment.

In the reaction, the hydrophilic organic compound I and the hydrophilic organic compound II may be mixed and reacted with isocyanate-terminated dicyclohexylmethanecarbodiimide, or the hydrophilic organic compound I and the hydrophilic organic compound II may be reacted separately from each other with isocyanate-terminated dicyclohexylmethanecarbodiimide.

The hydrophilic organic compound A represented by the general formula (A) is reacted with the isocyanate group of the isocyanate-terminated carbodiimide compound, thereby forming a group represented by the following general formula (a); the hydrophilic organic compound B represented by the general formula (B) is reacted with the isocyanate group of the isocyanate-terminated carbodiimide compound, thereby forming a group represented by the following general formula (b); the hydrophilic organic compound C represented by the general formula (C) is reacted with the isocyanate group of the isocyanate-terminated carbodiimide compound, thereby forming a group represented by the following general formula (c); and the hydrophilic organic compound D represented by the general formula (D) is reacted with the isocyanate group of the isocyanate-terminated carbodiimide compound, thereby forming a group represented by the following general formula (d).

The groups thus formed correspond to the $R^1$—O— group in the carbodiimide compound represented by the general formula (1).

$$(R^2)_2\text{—N—CH}_2\text{—CHR}^3\text{—O—} \qquad (a)$$

wherein $R^2$ represents an alkyl group having from 1 to 4 carbon atoms, and $R^3$ represents a hydrogen atom or an alkyl group having from 1 to 4 carbon atoms.

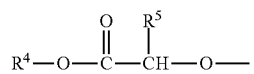
(b)

wherein $R^4$ represents an alkyl group having from 1 to 3 carbon atoms, and $R^5$ represents a hydrogen atom or an alkyl group having from 1 to 3 carbon atoms.

$$R^6\text{—O—(CH}_2\text{—CHR}^7\text{—O)}_m\text{—} \qquad (c)$$

wherein $R^6$ represents an alkyl group having from 1 to 4 carbon atoms, $R^7$ represents a hydrogen atom or an alkyl group having from 1 to 4 carbon atoms, and m represents an integer of from 1 to 3.

$$R^8\text{—O—(CH}_2\text{—CHR}^9\text{—O)}_m\text{—} \qquad (d)$$

wherein $R^8$ represents an alkyl group having from 1 to 4 carbon atoms or a phenyl group, $R^9$ represents a hydrogen atom or a methyl group, and m represents an integer of from 4 to 30.

The ratio (molar ratio) of the hydrophilic organic compound I and the hydrophilic organic compound II is preferably from 9/1 to 1/9, and more preferably 3/1 to 1/3. When the ratio is in the range, sufficient affinity is exhibited upon the addition to a water soluble or water dispersible aqueous resin thereby providing the intended capability.

Examples of the water-miscible liquid compound used in the present invention include a water-miscible liquid compound represented by the general formula (2) and a monoalcohol having from 3 to 10 carbon atoms:

$$R^{10}\text{O—(CH}_2\text{—CHR}^{11}\text{—O)}_m\text{—R}^{12} \qquad (2)$$

wherein $R^{10}$ and $R^{12}$ each represent an alkyl group or an acyl group having from 1 to 4 carbon atoms, a hydrogen atom or a phenyl group, $R^{11}$ represents a hydrogen atom or a methyl group, and m represents an integer of from 1 to 3.

Specific examples of the alkyl group having from 1 to 4 carbon atoms represented by $R^{10}$ and $R^{12}$ in the general formula (2) include a methyl group, an ethyl group, a propyl group, an isopropyl group, a n-butyl group, a s-butyl group, an isobutyl group and a t-butyl group, and specific examples of the acyl group having 1 to 4 carbon atoms represented thereby include an acetyl group and a propyonyl group.

Specific examples of the water-miscible liquid compound include a polyalkylene glycol monoalkyl ether compound, such as ethylene glycol monomethyl ether, ethylene glycol monoethyl ether, ethylene glycol monopropyl ether, ethylene glycol monobutyl ether, diethylene glycol monoethyl ether, diethylene glycol monobutyl ether, propylene glycol monomethyl ether, propylene glycol monopropyl ether, dipropylene glycol monomethyl ether, dipropylene glycol monobutyl ether, tripropylene glycol monomethyl ether and tripropylene glycol monobutyl ether; a polyalkylene glycol dialkyl ether compound, such as diethylene glycol dimethyl ether, triethylene glycol dimethyl ether and dipropylene glycol dimethyl ether; a polyalkylene glycol monoalkyl ether acetate compound, such as ethylene glycol monomethyl ether acetate, ethylene glycol monoethyl ether acetate, ethylene glycol monobutyl ether acetate, diethylene glycol monoethyl ether acetate, diethylene glycol monobutyl ether acetate, propylene glycol monomethyl ether acetate and dipropylene glycol monomethyl ether acetate; a polyalkylene glycol diacetate compound, such as ethylene glycol diacetate and propylene glycol diacetate; a polyalkylene glycol monophenyl ether compound, such as ethylene glycol monophenyl ether and propylene glycol monophenyl ether; and a monoalcohol compound, such as propanol, butanol, hexanol and octanol.

Examples of the water-miscible liquid compound used in the present invention also include an N-substituted amide compound, such as N-methyl-2-pyrrolidone (NMP) and N-ethyl-2-pyrrolidone (NEP); and 2,2,4-trimethyl-1,3-pentanediol monoisobutylate.

These compounds may be used solely or as a mixture of two or more kinds thereof.

The resin crosslinking agent of the present invention may be mixed with water as a solvent in addition to the water-miscible liquid compound in such a range that does not impair the advantages of the present invention. In this case, the mixing ratio of the water-miscible liquid compound and water is preferably from 1/9 to 10/0, and more preferably from 2/8 to 9/1, in terms of mass ratio. Accordingly, the carbodiimide compound may be diluted with the aforementioned water-miscible liquid compound in advance, and may be added to a resin, thereby enhancing the scuffing resistance and the chemical resistance.

In the resin crosslinking agent of the present invention, the ratio (solid concentration) of the carbodiimide compound and the solvent (i.e., the total amount of the water-miscible liquid compound and water used depending on necessity) may be appropriately selected from such a range that exhibits the capability of the crosslinking agent and does not impair the handleability thereof, and is, for example, from 10 to 80% by mass. When the solid concentration is 10% by mass of more, a too large amount of the crosslinking agent may not be necessarily added to an aqueous resin for providing the crosslinking capability, and when the solid concentration is 80% by mass or less, the solution may not have a too large viscosity, thereby enhancing the handleability thereof. In this point of view, the ratio (solid concentration) is preferably from 20 to 70% by mass, and more preferably from 30 to 50% by mass.

The resin crosslinking agent of the present invention may be added to a crosslinking aqueous resin, thereby providing an aqueous paint composition.

Examples of the crosslinking aqueous resin include an aqueous acrylic resin, an aqueous polyester resin, an aqueous polyurethane resin, an aqueous epoxy resin and an aqueous amino resin.

In the aqueous paint composition, the mixing ratios of the components may be arbitrarily determined, and in consideration of the properties of the resulting coated film and the balance with economy, the carbodiimide compound of the present invention is preferably used in a ratio of from 0.5 to 30 parts by mass, and more preferably used in a ratio of from 1 to 10 parts by mass, per 100 parts by mass of the aqueous resin (solid content). In view of the same factors, the resin crosslinking agent of the present invention is preferably used in a ratio of from 0.5 to 200 parts by mass, and more preferably used in a ratio of from 1.0 to 100 parts by mass, per 100 parts by mass of the aqueous resin (solid content).

The resin concentration of the aqueous solution or aqueous dispersion containing the aqueous resin is not particularly limited, and is preferably from 15 to 50% by mass, more preferably from 20 to 40% by mass, and further preferably from 25 to 40% by mass, from the standpoint of the coating property of the resulting aqueous paint composition and the drying property of the coated layer.

The aqueous paint composition may contain depending on necessity various additive composition, such as a pigment, a filler, a leveling agent, a surfactant, a dispersant, a plasticizer, an ultraviolet ray absorbent and an antioxidant, according to the purposes or the like.

The aqueous paint composition may be coated on a prescribed substrate to form a coated layer, thereby providing a coated film.

In this case, the coating method may be any known method, for example, brush coating, tampon coating, spray coating, hot spray coating, airless spray coating, roller coating, curtain flow coating, flow coating, dip coating, knife edge coating and the like may be employed.

The coated layer after coating may be subjected to a curing treatment for accelerating curing. The curing treatment employed may be generally a method of accelerating the crosslinking reaction of the coated film by heating. The heating method is not particularly limited, and for example, a method using an electric heating furnace, a hot air heating furnace, an infrared ray heating furnace, a microwave heating furnace or the like may be employed.

EXAMPLE

The present invention will be described more specifically with reference to Synthesis Examples, Examples and Comparative Examples below, but the present invention is not limited to them. The unit "%" in the following description is based on mass unless otherwise indicated.

The analysis in Examples was performed in the following manners.
(1) Infrared (IR) Spectrum
FTIR-8200C (produced by Shimadzu Corporation) was used.
(2) GPC
RI detector: RID-6A (produced by Shimadzu Corporation)
Columns: KF-806, KF-804L, KF-804L
Developing solvent: THF, 1 mL/min
Calculated by standard polystyrene conversion
(3) NCO %
Hiranuma automatic titrator COM-900 (produced by Hiranuma Sangyo Co., Ltd) and Titstation K-900 (produced by Hiranuma Sangyo Co., Ltd) were used. A dibutylamine-toluene solution having a known concentration was added, and NCO % was calculated by potentiometric titration with a hydrochloric acid aqueous solution.

Synthesis Example 1

Polymerization of Isocyanate-Terminated Carbodiimide 1,572 g of 4,4'-dicyclohexylmethanediisocyanate and 7.86 g of a carbodiimidation catalyst (3-methyl-1-phenyl-2-phospholene-1-oxide) were placed in a 3,000 mL reaction vessel equipped with a reflux condenser and an agitator, and agitated under a nitrogen stream at 185° C. for hours, thereby providing isocyanate-terminated 4,4'-dicyclohexylmethanecarbodiimide (polymerization degree n=3). The absorption peak derived from the carbodiimide group around a wavelength of 2,150 cm$^{-1}$ was confirmed by infrared (IR) spectroscopy. The NCO % measured was 9.16%.

Synthesis Example 2

Capping with Polyethylene Glycol Monomethyl Ether and Diethylisopropanolamine 51.8 g of isocyanate-terminated 4,4'-dicyclohexylmethanecarbodiimide (polymerization degree n=3) obtained in Synthesis Example 1 was melted at 120° C., to which 22.6 g of polyethylene glycol monomethyl ether (average molecular weight: 400) and 7.41 g of diethylisopropanolamine were added, and the mixture was heated to 130° C. and reacted under agitation for 5 hours. Disappearance of the absorption derived from the isocyanate group at a wavelength of from 2,200 to 2,300 cm$^{-1}$ was then confirmed by infrared (IR) spectroscopy, and thus a polycarbodiimide compound as a pale yellow transparent matter was obtained. The standard polystyrene conversion number average molecular weight thereof was 1,500 as measured by GPC.

Synthesis Example 3

Capping with Polyethylene Glycol Monomethyl Ether and Dimethylethanolamine 51.8 g of isocyanate-terminated 4,4'-dicyclohexylmethanecarbodiimide (polymerization degree n=3) obtained in Synthesis Example 1 was melted at 120° C., to which 22.6 g of polyethylene glycol monomethyl ether (average molecular weight: 400) and 5.0 g of dimethylethanolamine were added, and the mixture was heated to 150° C. and reacted under agitation for 5 hours. Disappearance of the absorption derived from the isocyanate group at a wavelength of from 2,200 to 2,300 cm$^{-1}$ was then confirmed by infrared (IR) spectroscopy, and thus a carbodiimide compound as a pale yellow transparent matter was obtained. The standard polystyrene conversion number average molecular weight thereof was 1,500 as measured by GPC.

Synthesis Example 4

Capping with Polyethylene Glycol Monomethyl Ether and Dibutylethanolamine 51.8 g of isocyanate-terminated 4,4'-dicyclohexylmethanecarbodiimide (polymerization degree n=3) obtained in Synthesis Example 1 was melted at 120° C., to which 22.6 g of polyethylene glycol monomethyl ether (average molecular weight: 400) and 9.79 g of dibutylethanolamine were added, and the mixture was heated to 150° C. and reacted under agitation for 5 hours. Disappearance of the absorption derived from the isocyanate group at a wavelength of from 2,200 to 2,300 cm$^{-1}$ was then confirmed by infrared (IR) spectroscopy, and thus a carbodiimide compound as a pale yellow transparent matter was obtained. The standard polystyrene conversion number average molecular weight thereof was 1,500 as measured by GPC.

Synthesis Example 5

Capping with Polyethylene Glycol Monomethyl Ether and Methyl Lactate 51.8 g of isocyanate-terminated 4,4'-dicyclohexylmethanecarbodiimide (polymerization degree n=3) obtained in Synthesis Example 1 was melted at 120° C., to which 22.6 g of polyethylene glycol monomethyl ether (average molecular weight: 400) and 5.88 g of methyl lactate were added, and the mixture was heated to 150° C. and reacted under agitation for 5 hours. Disappearance of the absorption derived from the isocyanate group at a wavelength of from 2,200 to 2,300 cm$^{-1}$ was then confirmed by infrared (IR) spectroscopy, and thus a carbodiimide compound as a pale yellow transparent matter was obtained. The standard polystyrene conversion number average molecular weight thereof was 1,500 as measured by GPC.

Synthesis Example 6

Capping with Polyethylene Glycol Monomethyl Ether and Methyl Glycolate 51.8 g of isocyanate-terminated 4,4'-dicyclohexylmethanecarbodiimide (polymerization degree n=3) obtained in Synthesis Example 1 was melted at 120° C., to which 22.6 g of polyethylene glycol monomethyl ether (average molecular weight: 400) and 5.1 g of methyl glycolate were added, and the mixture was heated to 150° C. and reacted under agitation for 5 hours. Disappearance of the absorption derived from the isocyanate group at a wavelength of from 2,200 to 2,300 cm$^{-1}$ was then confirmed by infrared (IR) spectroscopy, and thus a carbodiimide compound as a pale yellow transparent matter was obtained. The standard polystyrene conversion number average molecular weight thereof was 1,500 as measured by GPC.

Synthesis Example 7

Capping with Polyethylene Glycol Monomethyl Ether and Propylene Glycol Monomethyl Ether 51.8 g of isocyanate-terminated 4,4'-dicyclohexylmethanecarbodiimide (polymerization degree n=3) obtained in Synthesis Example 1 was melted at 120° C., to which 22.6 g of polyethylene glycol monomethyl ether (average molecular weight: 400) and 5.1 g of propylene glycol monomethyl ether were added, and the mixture was heated to 150° C. and reacted under agitation for 5 hours. Disappearance of the absorption derived from the isocyanate group at a wavelength of from 2,200 to 2,300 cm$^{-1}$ was then confirmed by infrared (IR) spectroscopy, and thus a carbodiimide compound as a pale yellow transparent matter was obtained. The standard polystyrene conversion number average molecular weight thereof was 1,500 as measured by GPC.

Example 1

The carbodiimide compound obtained in Synthesis Example 2 was mixed with diethylene glycol monobutyl ether to make a solid concentration of the carbodiimide compound of 40%, thereby producing a resin crosslinking agent.

0.7 g of the resin crosslinking agent thus obtained was added to 10 g of a urethane resin aqueous dispersion ("443-47T", produced by Bonakemi, solid concentration: 32%), and the mixture was well agitated, thereby preparing an aqueous paint composition.

Wood was undercoated with an acrylic resin with a sponge brush. Then, the resulting aqueous paint composition was coated thereon to a thickness of 20 μm and dried at 25° C. for 2 hours, and the coated layer after drying was polished with sandpaper (#320). The procedure was repeated three times, thereby producing a specimen having the aqueous paint composition coated with three layers.

Examples 2 to 6

Specimens having the aqueous paint composition coated with three layers were produced in the same manner as in Example 1 except that the carbodiimide compound obtained in Synthesis Example 2 was changed to the carbodiimide compounds obtained in Synthesis Examples 3 to 7.

Example 7

The carbodiimide compound obtained in Synthesis Example 2 was mixed with a mixed solution of diethylene glycol monobutyl ether and water (mass ratio: 50/50) to make a solid concentration of the carbodiimide compound of 40%, thereby producing a resin crosslinking agent.

0.7 g of the resin crosslinking agent thus obtained was added to 10 g of a urethane resin aqueous dispersion ("443-47T", produced by Bonakemi, solid concentration: 32%), and the mixture was well agitated, thereby preparing an aqueous paint composition.

Wood was undercoated with an acrylic resin with a sponge brush. Then, the resulting aqueous paint composition was coated thereon to a thickness of 20 μm and dried at 25° C. for 2 hours, and the coated layer after drying was polished with sandpaper (#320). The procedure was repeated three times, thereby producing a specimen having the aqueous paint composition coated with three layers.

Examples 8 to 12

Specimens having the aqueous paint composition coated with three layers were produced in the same manner as in Example 7 except that the carbodiimide compound obtained in Synthesis Example 2 was changed to the carbodiimide compounds obtained in Synthesis Examples 3 to 7.

Comparative Example 1

The carbodiimide compound obtained in Synthesis Example 2 was mixed with water to make a solid concentration of the carbodiimide compound of 40%, thereby producing a resin crosslinking agent.

0.7 g of the resin crosslinking agent thus obtained was added to 10 g of a urethane resin aqueous dispersion ("443-47T", produced by Bonakemi, solid concentration: 32%), and the mixture was well agitated, thereby preparing an aqueous paint composition.

Wood was undercoated with an acrylic resin with a sponge brush. Then, the resulting aqueous paint composition was coated thereon to a thickness of 20 μm and dried at 25° C. for 2 hours, and the coated layer after drying was polished with sandpaper (#320). The procedure was repeated three times, thereby producing a specimen having the aqueous paint composition coated with three layers.

Comparative Examples 2 to 6

Specimens having the aqueous paint composition coated with three layers were produced in the same manner as in Comparative Example 1 except that the carbodiimide compound obtained in Synthesis Example 2 was changed to the carbodiimide compounds obtained in Synthesis Examples 3 to 7.

Examples 13 to 19

Specimens having the aqueous paint composition coated with three layers were produced in the same manner as in Example 7 except that the ratio of diethylene glycol monobutyl ether and water in Example 7 was changed to the ratios shown in Table 4.

Examples 20 to 37

Specimens having the aqueous paint composition coated with three layers were produced in the same manner as in Example 1 except that diethylene glycol monobutyl ether in Example 1 was changed to the water-miscible liquid compounds shown in Tables 5 and 6.

The specimens thus produced were measured for properties in the following manners.

The specimens thus produced were subjected to the following evaluation after 3 days, 7 days and 14 days, at ordinary temperature, respectively.

(1) Chemical Resistance Test

Absorbent cotton impregnated with a 1% sodium hydroxide aqueous solution was placed on the specimen thus produced, and the change of the coated film after 2 hours was observed.

Evaluation Standard

A: No appearance change was observed in wet state and after drying.

B: In wet state, no change of the coated film was observed but the substrate (wood) was penetrated to make change observed, and after drying, the original appearance was restored.

C: The coated film was considerably swollen in wet state, and severe damages remained after drying.

Scuffing Resistance

The coated surface of the specimen was rubbed with a pendulum test device with a top weight of 1 kg and a pendulum radius of 1 m having an ice hockey puck attached to the top from a height of 1 m, thereby making a black mark (black heel mark) thereon. Thereafter, the black mark was wiped out with cloth, and the appearance was evaluated.

Evaluation Standard

AA: After wiping, the black mark was completely removed, and no damage was observed on the coated film.

A: After wiping, the black mark was completely removed, and slight damage was observed on the coated film but caused no practical problem.

B: After wiping, the black mark was completely removed, but damage was observed on the coated film, and a rubbed mark was observed thereon.

C: After wiping, the black mark remained, and damage was apparently observed on the coated film.

TABLE 1

| | | Example | | | | | |
|---|---|---|---|---|---|---|---|
| | | 1 | 2 | 3 | 4 | 5 | 6 |
| Base material | Urethane resin aqueous dispersion (443-47T, produced by Bonakemi) | 100 | 100 | 100 | 100 | 100 | 100 |
| Resin cross-linking agent *1 | Synthesis Example 2/diethylene glycol monobutyl ether (40/60) | 7 | | | | | |
| | Synthesis Example 3/diethylene glycol monobutyl ether (40/60) | | 7 | | | | |
| | Synthesis Example 4/diethylene glycol monobutyl ether (40/60) | | | 7 | | | |
| | Synthesis Example 5/diethylene glycol monobutyl ether (40/60) | | | | 7 | | |
| | Synthesis Example 6/diethylene glycol monobutyl ether (40/60) | | | | | 7 | |
| | Synthesis Example 7/diethylene glycol monobutyl ether (40/60) | | | | | | 7 |
| Evaluation | Sodium hydroxide resistance (3 days) | A | A | A | B | B | B |
| | Sodium hydroxide resistance (7 days) | A | A | A | A | A | B |
| | Sodium hydroxide resistance (14 days) | A | A | A | A | A | B |
| | Scuffing resistance (3 days) | A | A | A | A | A | A |
| | Scuffing resistance (7 days) | AA | AA | AA | AA | AA | AA |
| | Scuffing resistance (14 days) | AA | AA | AA | AA | AA | AA |

*1: The numerals in parentheses for the resin crosslinking agent show compositional ratio (mass ratio).

TABLE 2

|  |  | Example |  |  |  |  |  |
|---|---|---|---|---|---|---|---|
|  |  | 7 | 8 | 9 | 10 | 11 | 12 |
| Base material | Urethane resin aqueous dispersion (443-47T, produced by Bonakemi) | 100 | 100 | 100 | 100 | 100 | 100 |
| Resin cross-linking agent *1 | Synthesis Example 2/diethylene glycol monobutyl ether/water (40/30/30) | 7 |  |  |  |  |  |
|  | Synthesis Example 3/diethylene glycol monobutyl ether/water (40/30/30) |  | 7 |  |  |  |  |
|  | Synthesis Example 4/diethylene glycol monobutyl ether/water (40/30/30) |  |  | 7 |  |  |  |
|  | Synthesis Example 5/diethylene glycol monobutyl ether/water (40/30/30) |  |  |  | 7 |  |  |
|  | Synthesis Example 6/diethylene glycol monobutyl ether/water (40/30/30) |  |  |  |  | 7 |  |
|  | Synthesis Example 7/diethylene glycol monobutyl ether/water (40/30/30) |  |  |  |  |  | 7 |
| Evaluation | Sodium hydroxide resistance (3 days) | A | A | A | B | B | B |
|  | Sodium hydroxide resistance (7 days) | A | A | A | A | A | B |
|  | Sodium hydroxide resistance (14 days) | A | A | A | A | A | B |
|  | Scuffing resistance (3 days) | A | A | A | A | A | A |
|  | Scuffing resistance (7 days) | AA | AA | AA | AA | AA | AA |
|  | Scuffing resistance (14 days) | AA | AA | AA | AA | AA | AA |

*1: The numerals in parentheses for the resin crosslinking agent show compositional ratio (mass ratio).

TABLE 3

|  |  | Comparative Example |  |  |  |  |  |
|---|---|---|---|---|---|---|---|
|  |  | 1 | 2 | 3 | 4 | 5 | 6 |
| Base material | Urethane resin aqueous dispersion (443-47T, produced by Bonakemi) | 100 | 100 | 100 | 100 | 100 | 100 |
| Resin cross-linking agent *1 | Synthesis Example 2/water (40/60) | 7 |  |  |  |  |  |
|  | Synthesis Example 3/water (40/60) |  | 7 |  |  |  |  |
|  | Synthesis Example 4/water (40/60) |  |  | 7 |  |  |  |
|  | Synthesis Example 5/water (40/60) |  |  |  | 7 |  |  |
|  | Synthesis Example 6/water (40/60) |  |  |  |  | 7 |  |
|  | Synthesis Example 7/water (40/60) |  |  |  |  |  | 7 |
| Evaluation | Sodium hydroxide resistance (3 days) | B | B | C | C | C | C |
|  | Sodium hydroxide resistance (7 days) | B | B | B | B | B | C |
|  | Sodium hydroxide resistance (14 days) | B | B | B | B | B | C |
|  | Scuffing resistance (3 days) | B | B | B | B | B | B |
|  | Scuffing resistance (7 days) | B | B | B | B | B | B |
|  | Scuffing resistance (14 days) | A | A | A | B | B | B |

*1: The numerals in parentheses for the resin crosslinking agent show compositional ratio (mass ratio).

TABLE 4

|  |  | Example |  |  |  |  |  |  |
|---|---|---|---|---|---|---|---|---|
|  |  | 13 | 14 | 15 | 16 | 17 | 18 | 19 |
| Base material | Urethane resin aqueous dispersion (443-47T, produced by Bonakemi) | 100 | 100 | 100 | 100 | 100 | 100 | 100 |
| Resin cross-linking agent *1 | Synthesis Example 2/diethylene glycol monobutyl ether/water (40/54/6) | 7 |  |  |  |  |  |  |
|  | Synthesis Example 2/diethylene glycol monobutyl ether/water (40/48/12) |  | 7 |  |  |  |  |  |
|  | Synthesis Example 2/diethylene glycol monobutyl ether/water (40/42/18) |  |  | 7 |  |  |  |  |
|  | Synthesis Example 2/diethylene glycol monobutyl ether/water (40/36/24) |  |  |  | 7 |  |  |  |
|  | Synthesis Example 2/diethylene glycol monobutyl ether/water (40/24/36) |  |  |  |  | 7 |  |  |
|  | Synthesis Example 2/diethylene glycol monobutyl ether/water (40/18/36) |  |  |  |  |  | 7 |  |
|  | Synthesis Example 2/diethylene glycol monobutyl ether/water (40/12/48) |  |  |  |  |  |  | 7 |
| Evaluation | Sodium hydroxide resistance (3 days) | A | A | A | A | A | A | B |
|  | Sodium hydroxide resistance (7 days) | A | A | A | A | A | A | A |
|  | Sodium hydroxide resistance (14 days) | A | A | A | A | A | A | A |
|  | Scuffing resistance (3 days) | A | A | A | A | A | A | A |
|  | Scuffing resistance (7 days) | AA | AA | AA | AA | AA | AA | AA |
|  | Scuffing resistance (14 days) | AA | AA | AA | AA | AA | AA | AA |

*1: The numerals in parentheses for the resin crosslinking agent show compositional ratio (mass ratio).

TABLE 5

| | | Example | | | | | | | | |
|---|---|---|---|---|---|---|---|---|---|---|
| | | 20 | 21 | 22 | 23 | 24 | 25 | 26 | 27 | 28 |
| Base material | Urethane resin aqueous dispersion (443-47T, produced by Bonakemi) | 100 | 100 | 100 | 100 | 100 | 100 | 100 | 100 | 100 |
| Resin crosslinking agent *1 | Synthesis Example 2/ethylene glycol monopropyl ether (40/60) | 7 | | | | | | | | |
| | Synthesis Example 2/ethylene glycol monophenyl ether (40/60) | | 7 | | | | | | | |
| | Synthesis Example 2/diethylene glycol monomethyl ether (40/60) | | | 7 | | | | | | |
| | Synthesis Example 2/diethylene glycol monoethyl ether (40/60) | | | | 7 | | | | | |
| | Synthesis Example 2/diethylene glycol dimethyl ether (40/60) | | | | | 7 | | | | |
| | Synthesis Example 2/propylene glycol monopropyl ether (40/60) | | | | | | 7 | | | |
| | Synthesis Example 2/propylene glycol monophenyl ether (40/60) | | | | | | | 7 | | |
| | Synthesis Example 2/dipropylene glycol monomethyl ether (40/60) | | | | | | | | 7 | |
| | Synthesis Example 2/dipropylene glycol monobutyl ether (40/60) | | | | | | | | | 7 |
| Evaluation | Sodium hydroxide resistance (3 days) | B | A | A | A | B | A | A | A | A |
| | Sodium hydroxide resistance (7 days) | A | A | A | A | A | A | A | A | A |
| | Sodium hydroxide resistance (14 days) | A | A | A | A | A | A | A | A | A |
| | Scuffing resistance (3 days) | A | A | A | A | A | A | A | A | A |
| | Scuffing resistance (7 days) | A | AA | AA | AA | A | A | AA | A | A |
| | Scuffing resistance (14 days) | AA | AA | AA | AA | AA | AA | AA | AA | AA |

*1: The numerals in parentheses for the resin crosslinking agent show compositional ratio (mass ratio).

TABLE 6

| | | Example | | | | | | | | |
|---|---|---|---|---|---|---|---|---|---|---|
| | | 29 | 30 | 31 | 32 | 33 | 34 | 35 | 36 | 37 |
| Base material | Urethane resin aqueous dispersion (443-47T, produced by Bonakemi) | 100 | 100 | 100 | 100 | 100 | 100 | 100 | 100 | 100 |
| Resin crosslinking agent *1 | Synthesis Example 2/dipropylene glycol dimethyl ether (40/60) | 7 | | | | | | | | |
| | Synthesis Example 2/tripropylene glycol monomethyl ether (40/60) | | 7 | | | | | | | |
| | Synthesis Example 2/tripropylene glycol monobutyl ether (40/60) | | | 7 | | | | | | |
| | Synthesis Example 2/diethylene glycol monobutyl ether acetate (40/60) | | | | 7 | | | | | |
| | Synthesis Example 2/1-propanol (40/60) | | | | | 7 | | | | |
| | Synthesis Example 2/1-octanol (40/60) | | | | | | 7 | | | |
| | Synthesis Example 2/NMP (40/60) | | | | | | | 7 | | |
| | Synthesis Example 2/NEP (40/60) | | | | | | | | 7 | |
| | Synthesis Example 2/2,2,4-trimethyl-1,3-pentanediol monoisobutylate (40/60) | | | | | | | | | 7 |
| Evaluation | Sodium hydroxide resistance (3 days) | B | A | A | A | B | B | B | B | A |
| | Sodium hydroxide resistance (7 days) | A | A | A | A | A | A | A | A | A |
| | Sodium hydroxide resistance (14 days) | A | A | A | A | A | A | A | A | A |
| | Scuffing resistance (3 days) | A | A | A | A | A | A | A | A | A |
| | Scuffing resistance (7 days) | AA | AA | AA | AA | A | A | A | A | AA |
| | Scuffing resistance (14 days) | AA | AA | AA | AA | AA | AA | AA | AA | AA |

*1: The numerals in parentheses for the resin crosslinking agent show compositional ratio (mass ratio).

As shown in Tables 1 to 6, it is understood that the aqueous paint compositions containing the resin crosslinking agent according to the present invention produced in Examples 1 to 37 have excellent chemical resistance and scuffing resistance as compared to Comparative Examples 1 to 6.

INDUSTRIAL APPLICABILITY

The resin crosslinking agent of the present invention is excellent in scuffing resistance and chemical resistance, and may be favorably applied to a floor coating material for tiles and wooden floors, a paint composition, a coating agent and the like by adding the resin crosslinking agent to an aqueous resin.

The invention claimed is:
1. A resin crosslinking agent comprising: a carbodiimide compound having at least one carbodiimide group, having terminals that are capped with at least one compound (hydrophilic organic compound I) selected from a dialkylamino alcohol, a hydroxycarboxylic acid alkyl ester and a (poly) alkylene glycol monoalkyl ether, and with a compound (hydrophilic organic compound II) that has higher hydrophilicity than the hydrophilic organic compound I and has at least one hydroxyl group; a water-miscible liquid compound; and water, wherein the mixing ratio of the water-miscible liquid compound and water is from 2/8 to 9/1, in terms of mass ratio.

2. The resin crosslinking agent according to claim 1, wherein the carbodiimide compound is a carbodiimide compound represented by the general formula (1):

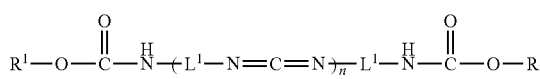

(1)

wherein n represents an integer of from 1 to 15; $L^1$ represents a divalent aliphatic hydrocarbon group having from 1 to 18 carbon atoms, a divalent alicyclic hydrocarbon group having from 3 to 13 carbon atoms, a divalent aromatic hydrocarbon group having from 6 to 14 carbon atoms or a divalent heterocyclic group having from 3 to 12 carbon atoms, in which plural groups represented by $L^1$ may be the same as or different from each other; and $R^1$ represents a residual group of at least one compound (hydrophilic organic compound I) selected from a dialkylamino alcohol, a hydroxycarboxylic acid alkyl ester and a (poly)alkylene glycol monoalkyl ether, or a residual group of a compound (hydrophilic organic compound II) that has higher hydrophilicity than the hydrophilic organic compound I and has at least one hydroxyl group, in which two groups represented by $R^1$ may be the same as or different from each other.

3. The resin crosslinking agent according to claim 1, wherein a ratio (molar ratio) of the at least one compound (hydrophilic organic compound I) selected from a dialkylamino alcohol, a hydroxycarboxylic acid alkyl ester and a (poly)alkylene glycol monoalkyl ether and the compound (hydrophilic organic compound II) that has higher hydrophilicity than the hydrophilic organic compound I and has at least one hydroxyl group is from 9/1 to 1/9.

4. The resin crosslinking agent according to claim 2, wherein $R^1$ represents a residual group of at least one compound (hydrophilic organic compound I-a) selected from:

a dialkylamino alcohol represented by the general formula (A):

  (A)

wherein $R^2$ represents an alkyl group having from 1 to 4 carbon atoms, and $R^3$ represents a hydrogen atom or an alkyl group having from 1 to 4 carbon atoms, a hydroxycarboxylic acid alkyl ester represented by the general formula (B):

  (B)

wherein $R^4$ represents an alkyl group having from 1 to 3 carbon atoms, and $R^5$ represents a hydrogen atom or an alkyl group having from 1 to 3 carbon atoms, and a (poly)alkylene glycol monoalkyl ether represented by the general formula (C):

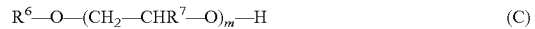  (C)

wherein $R^6$ represents an alkyl group having from 1 to 4 carbon atoms, $R^7$ represents a hydrogen atom or an alkyl group having from 1 to 4 carbon atoms, and m represents an integer of from 1 to 3, or a residual group of a polyalkylene oxide having terminals capped with an alkoxy group or a phenoxy group, which is a compound that has higher hydrophilicity than the hydrophilic organic compound I-a and is represented by the general formula (D):

  (D)

wherein $R^8$ represents an alkyl group having from 1 to 4 carbon atoms or a phenyl group, $R^9$ represents a hydrogen atom or an alkyl group having from 1 to 4 carbon atoms, and m represents an integer of from 4 to 30.

5. The resin crosslinking agent according to claim 1, wherein the water-miscible liquid compound contains a water-miscible liquid compound represented by the general formula (2):

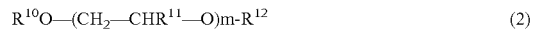  (2)

wherein $R^{10}$ and $R^{12}$ each represent an alkyl group or acyl group having from 1 to 4 carbon atoms, a hydrogen atom or a phenyl group, $R^{11}$ represents a hydrogen atom or a methyl group, and m represents an integer of from 1 to 3.

6. The resin crosslinking agent according to claim 1, wherein the water-miscible liquid compound is a monoalcohol having from 3 to 10 carbon atoms.

7. The resin crosslinking agent according to claim 2, wherein $L^1$ represents a divalent group of dicyclohexylmethane or a tetramethylxylylene group.

8. The resin crosslinking agent according to claim 1, wherein the content of the water-miscible liquid compound is from 12 to 54% by mass.

* * * * *